3,281,301
METHOD OF MAKING RIGID LAMINATE OF THERMOPLASTIC SHEETS HAVING INCREASED LOAD-BEARING ABILITY
Richard C. Bolesky, South Bend, Ind., assignor to United States Rubber Company, New York, N.Y., a corporation of New Jersey
Filed Dec. 11, 1963, Ser. No. 329,798
2 Claims. (Cl. 156—221)

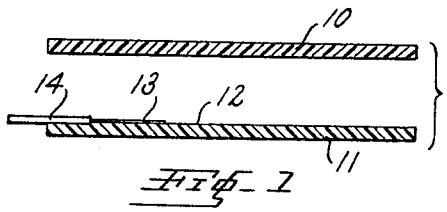
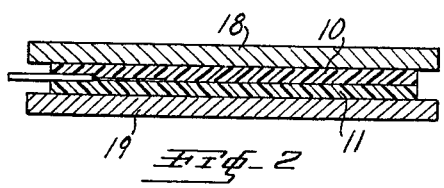
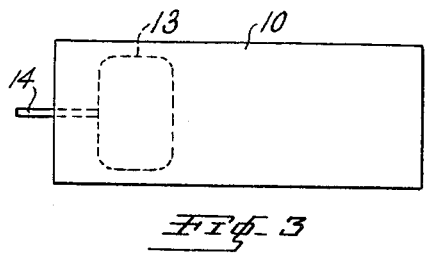
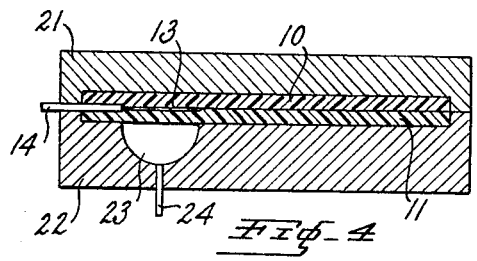
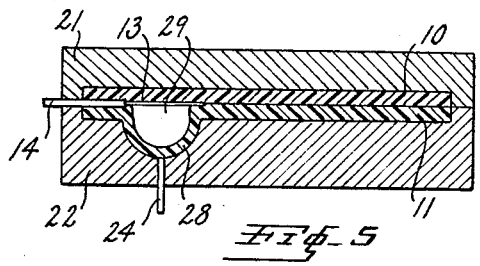
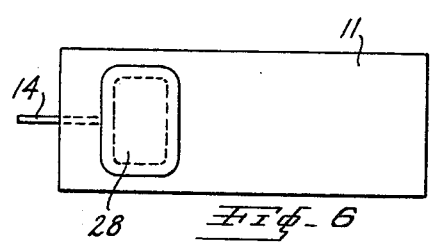
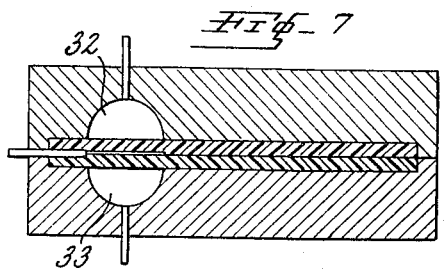
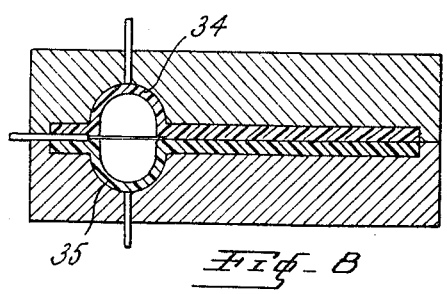
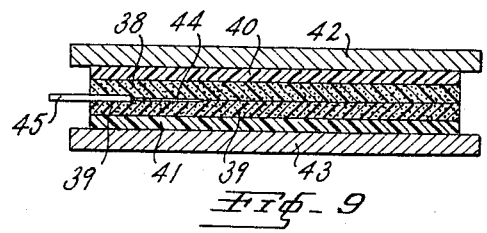
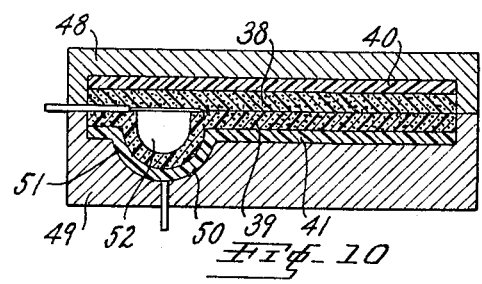
INVENTOR.
RICHARD C. BOLESKY
AGENT Oct. 25, 1966 R. C. BOLESKY 3,281,301
METHOD OF MAKING RIGID LAMINATE OF THERMOPLASTIC SHEETS
HAVING INCREASED LOAD-BEARING ABILITY
Filed Dec. 11, 1963
2 Sheets-Sheet 2
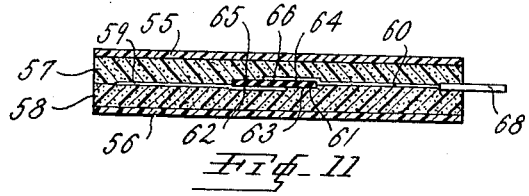
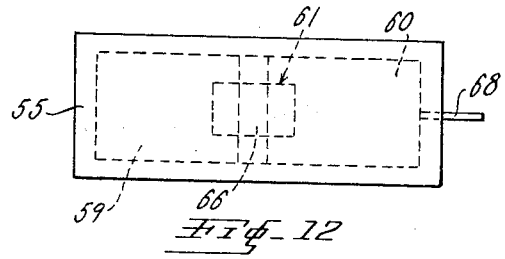
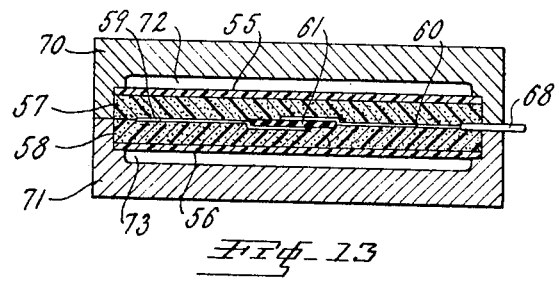
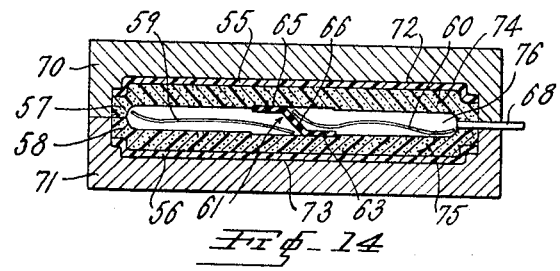
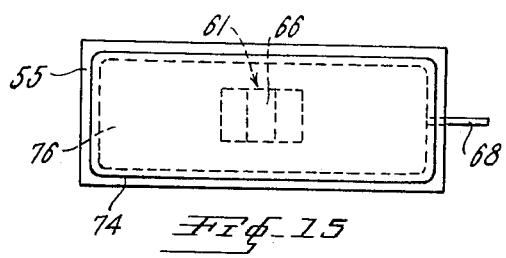
INVENTOR.
RICHARD C. BOLESKY
BY
AGENT United States Patent Office 3,281,301
Patented Oct. 25, 1966

This invention relates to laminated plastic material and to shaped articles, particularly hollow articles, produced therefrom, as well as to a method of making shaped laminated thermoplastic materials. More particularly the invention is directed to the reinforcement of laminated sheet materials by producing hollow sections between the layers in such a manner as to increase the rigidity and load-bearing ability of the laminate.

The invention will be described with reference to the accompanying drawings, wherein:

FIG. 1 is a sectional elevational view of plastic sheets preparatory to lamination;

FIG. 2 is a similar view of the plastic sheets being laminated between the platens of a press;

FIG. 3 is a plan view of the laminated sheets;

FIG. 4 is a sectional elevational view of the laminate in a mold prior to forming a hollow section in the laminate;

FIG. 5 is a view similar to FIG. 4, showing the hollow section formed in the laminate in the mold;

FIG. 6 is a plan view of the laminate with formed hollow section after removal from the mold;

FIG. 7 and FIG. 8 are views similar to FIGS. 4 and 5, respectively, showing a modification of the invention wherein hollow sections are formed in each side of the laminate;

FIGS. 9 and 10 are views similar to FIGS. 2 and 5, respectively, showing a modification of the invention in which the laminate includes expanded plastic layers;

FIG. 11 is a sectional elevational view of a modified laminate of the invention embodying a plastic piece to form a transverse reinforcing member in a hollow section of the laminate;

FIG. 12 is a plan view of the laminate of FIG. 11;

FIG. 13 is a sectional elevational view of the laminate of FIG. 11 disposed in a mold for forming hollow sections in the laminate;

FIG. 14 is a view similar to FIG. 13, showing the hollow sections formed in the laminate; and, FIG. 15 is a plan view of the modified laminate of FIG. 14 after removal from the mold.

Shaped articles are commonly made from thermoplastic materials by forming the thermoplastic material into a sheet and thereafter subjecting the sheet to a shaping operation, such as a drawing operation, frequently by vacuum forming or with the aid of equivalent differential pressure forming. When it is desired to make rigid articles relatively rigid thermoplastic sheets can be used, but for some purposes, such as automobile or truck doors, trunk lids or hoods, boat hulls, trailer bodies, or the like, the shaped articles are still not sufficiently rigid and subsequent reinforcement has to be resorted to. Lamination of more than one layer of thermoplastic material, particularly when one of the layers is made of an expanded plastic as described in U.S. Patents 3,041,220. Martin et al., June 26, 1962, or 3,070,817, Jan. 1, 1963, makes possible increased rigidity, but for some purposes even more stiffness and load-bearing capacity are desirable. Various proposals for increasing the rigidity such as forming ribs in the plastic sheets, lamination with epoxy resin or the like in combination with fabrics (such as glass cloth, etc.), and the bonding of metal parts to the plastic sheet, are deficient in one or more of the following respects:

(1) Lack of strength.
(2) Addition of weight.
(3) Limitation of appearance of surface in finished part to that required by the added reinforcing parts.
(4) The added reinforcement requires extra operations, increasing the labor and tooling costs.

The present invention is directed to a method of reinforcing articles made from thermoplastic sheet material, which does not require any foreign reinforcing member bonded to the surface, but instead deforms the plastic sheet in a unique manner so that it is self-reinforcing. The method is suited to laminated structures comprising two or more plastic sheets.

In accordance with the invention, certain pre-selected areas of the plastic sheets, prior to lamination, are treated in such manner as to make them non-adherent to each other, for example by applying a non-adhesive parting membrane of any suitable kind (e.g. a piece of paper, or a layer of talc). The plastic sheets are then laminated together, for example by superimposing the sheets and applying heat and pressure whereby the contacting faces of the sheets become adhered together except at the pre-selected localized areas or islands where the parting membrane prevents adhesion.

Provision is made for access of air or other suitable fluid into the interior of the laminate at the area of the parting membrane. Thus, before the laminating operation there may be deposited between the sheets a bleeder member (such as a small tube or hose, or an air-wicking cord or the like or even a strip of the parting membrane) extending from the area of the parting membrane to an outer edge of the sheet. The parting membrane and bleeder member thus become sandwiched in between the sheets in a laminating operation; the area covered by the parting membrane is surrounded by and sealed off by the contacting, adhered areas of the laminated sheets, except for the opening or passageway represented by the bleeder means. Alternatively, instead of depositing a bleeder member between the sheets prior to the lamination, a hollow needle or the like may be injected into the area occupied by the parting membrane, subsequent to the lamination.

To make the laminate exceedingly rigid in accordance with the invention the laminate is heated to a temperature at which the plastic sheet material is readily shapable by application of differential pressure, and while the laminate is in this heated condition differential pressure is applied to the laminate, for example by applying vacuum to one or both of the outside surfaces of the laminate and/or by applying air or similar fluid under pressure to the bleeder member where it projects at the edge of the laminate, or to a hollow needle inserted as described. As a result of such application of differential shaping pressure, the areas in contact with the parting member are deformed away from each other forming a kind of internal bubble or hollow section. The size of the internal bubble may be controlled by regulating the pressure, particularly where a precisely shaped bulge is not required, but in those cases where more precise control of the dimensions of the expanded section is required, resort may be had to a properly placed rigid external confining means. Thus, the outward expansion can be controlled to provide the desired shape and cross-sectional dimension by means of a rigid form or mold of any suitable kind. It will be understood that the areas of the contacting faces of the laminated sheets which were not covered by the parting member remain adhered together during this operation. It will also be understood that when such formation of a hollow section between the layers of the laminate is accomplished by exterior application of vacuum, the outside air is sucked in through the bleeder member as the expansion of the hollow part takes place.

As a result of the formation of the described hollow section, the laminate is far more rigid and resistant to distortion under load than a simple laminate of the same two sheets adhered over their entire surfaces would be, and such reinforcement has been accomplished in accordance with the invention without additional weight or foreign material.

The laminate may be made of any suitable desired number of layers or sheets, and in accordance with a preferred practice of the invention one or more layers, particularly inner layers, may be made of expandable plastic as disclosed for example in U.S. Patents 3,041,220 and 3,070,817 previously referred to. The blowing or expansion of such layers may be accomplished prior to or simultaneously with the formation of the hollow section within the laminate.

It will be understood that there may be as many hollow sections as desired (for example, as few as one where a car door is concerned), variously positioned and variously shaped as desired, produced in accordance with the invention to provide an article of the desired shape and characteristics. The hollow section may be formed as a bulge extending out of one surface only, or it may be formed as a bulge extending out of both surfaces, depending on the shape of the forming member or mold used to apply differential pressure to the laminate. If desired, bulges may be formed in different directions in different parts of the sheet. The method can be used to make hollow objects such as spheres, hemispheres (flat on one side) and the like.

It will be apparent to those skilled in the art that the laminating step may be accomplished with the aid of any of a variety of conventional pressing and heating or vulcanizing devices, either continuously or batchwise.

In one form of the invention, provision is made for formation of cross-bracing or internal beam-like reinforcing structures inside the hollow section. This is accomplished by including, in the area covered by the parting membrane, an additional strip of plastic which is partially masked off or blocked off (by a parting means or membrane of the kind described) from contact with the layers of the laminate but is not entirely blocked or masked. Thus, such extra plastic strip may be interposed between the layers, prior to lamination of the layers, in such manner that at one end of the strip a marginal zone on one face of the strip contacts one layer of plastic while at the other end of the strip a marginal zone on the opposite face of the strip contacts the other layer of plastic. Upon lamination, opposite ends of the strip thus become adhered to opposed faces of the plastic layers. However, at a medial zone of the added strip (protected on each face, by a parting member, from contact with either plastic layer), such added strip adheres to neither plastic layer. Subsequently, upon application of differential pressure at elevated temperature to produce the internal bubble or expanded section, the added piece of plastic forms a kind of bridge transversing the bubble from one plastic sheet to the other. There is thus formed a highly effective beam-like reinforcement within the hollow section. By varying number, kind, size and shape of such internal beam-like members, a great variety of highly useful designs are made possible. It will be understood that this form of the invention is adaptable to use either with laminates based on solid layers of plastic or expanded or blown layers of plastic.

The invention is applicable to any conventional thermoplastic sheet material that can be laminated and heat formed, notably the ABS polymers (acrylonitrile-butadiene-styrene polymeric material) or compositions containing ABS polymers, such as mixtures of vinyl chloride resins with ABS polymers, and mixtures of ABS polymers with other resins and/or rubbers, such as butadiene-acrylonitrile rubber or the like. In addition to the compositions disclosed in the previously mentioned U.S. Patents 3,041,220 and 3,070,817, there may be mentioned the compositions disclosed in U.S. Patent 3,018,268, Daly, Jan. 23, 1962 and 3,080,267, Schmalz, March 23, 1963.

Referring to the drawing, and in particular to FIGS. 1–6 thereof, a form of the invention there shown involves provision of an upper rigid, heat-formable, thermoplastic sheet 10 and a similar lower plastic sheet 11. On the upper surface 12 of the lower plastic sheet 11 there is placed a thin piece of separating or parting material 13 (e.g., paper, silicone coating, or a plastic that is incompatible with the plastic sheets 10, 11 [e.g. polyethylene can serve as a parting plastic sheet when the plastic sheets 10, 11 are ABS plastic]). A small hollow tube 14 is also placed on the upper surface of the lower plastic sheet, leading from the separating material 13 to the outer edge of the sheet where it projects a suitable distance.

The sheets are superimposed in face to face contact and laminated, as shown in FIG. 2 between the heated platens 18, 19 of a press with the result that the plastic sheets become adhered together everywhere except at the area where they are separated by the parting member 13 (and, of course, except when they are separated by the tube 14). At this point the resulting laminate when removed from the press has the appearance shown in plan in FIG. 3, where the zone corresponding to the sheet of parting material 13 is seen to constitute an island surrounded by the adhered-together contacting faces of the sheets.

Next, the laminate is heated up to a temperature at which the particular plastic employed is readily heat formable, and the heated assembly is disposed in a mold having upper and lower halves 21, 22 (FIG. 4) defining a cavity which has the size and shape of the laminate but further has an enlarged cavity 23 corresponding in location to the sandwiched parting member 13. The tube 14 projects to the outside of the mold at the parting line thereof. Also another tube 24 (optional) leads from the enlarged cavity 23 to the outside of the mold, for use if desired in applying vacuum.

While the laminate is in such heated condition, air under pressure is introduced through the tube 14, causing a portion 28 (FIG. 5) of the lower plastic layer 11 of the laminate to conform to the enlarged cavity 23, thus forming a kind of bubble in such lower layer and producing an internal hollow 29 in the laminate at the location of the parting means 13 where the plastic layers were not adhered together. The laminate is allowed to cool, while in the desired shape, to a temperature at which it is form-sustaining, after which it may be removed from the mold, and has the appearance in plan view (from the bottom) shown in FIG. 6, wherein the expanded portion 28 will be seen to project from one side of the laminate. As indicated, vacuum may be applied at the tube 24 leading to the enlarged mold cavity 23 to aid in drawing the plastic into the desired bubble shape 28.

FIGS. 7 and 8 represent a sequence of operations such as just described in connection with FIGS. 4 and 5, except that the mold has two oppositely disposed enlarged cavities 32, 33 whereby two bulges 34, 35 are formed, one projecting from each side of the laminate.

As indicated, in accordance with a modification of the invention, there may be employed a laminate having inner layers 38, 39 (FIG. 9) made of blown plastic, sandwiched in between outer layers 40, 41 of solid plastic (as per U.S. Patents 3,041,220 and 3,070,817 referred to previously), all of the layers being firmly adhered together previously by lamination under heat and pressure, for example between platens 42, 43 of a press, except where an area of parting material 44 is positioned previous to the lamination step, for the purpose described, along with a tube 45 or the like to provide communication between the parting material and the outside of the laminate. (It will be understood that in the several forms of the invention shown herein, any given layer which is shown as a single layer for clarity may in fact be formed by plying up any desired number of thin sheets made by calendering or the like, to produce a desired thickness.) Again, the laminate in a heated condition is disposed between mold members 48, 49 (FIG. 10) and application of fluid pressure through the tube 45 causes the material to take the shape of an enlarged portion 50 of the mold, thereby forming a bulge 51 in the expanded and solid layers on one side of the laminate and producing a corresponding hollow space 52 in the interior.

Considering now the form of the invention referred to previously in which an internal bracing member is provided to give a kind of reinforcing beam effect, there may be provided, as shown in FIG. 11, a laminate of upper and lower solid layers 55, 56 and blown plastic layers 57, 58, heat and pressure laminated together as described previously. In this case adhesion of the layers is prevented at selected areas represented by non-adhering parting sheets 59, 60. The parting sheets partially overlap a strip 61 of rigid solid plastic, which may be the same as the outer plastic layers 55, 56, or at least is of a plastic compatible with (adherent to) the expanded plastic layers 57, 58. One parting sheet 59 covers a portion 62 of the lower face of the interposed plastic strip but leaves a marginal portion 63 of such lower face exposed. The other parting sheet 60 covers a portion 64 of the upper face of the plastic strip but leaves a marginal portion 65 of such upper face exposed. The exposed opposite faces 63, 65 of the plastic strip are located toward opposite edges of the plastic strip; there is a medial zone 66 of the plastic strip which is covered by the parting sheets on both faces so that both faces of the plastic strip are free from attachment at this zone. A tube 68 can extend from the parting means to the outside of the laminate. It will be understood, that, as previously, the various parts of the laminate are assembled and subjected to heat and pressure, resulting in adhesion of the layers everywhere except where prevented from adhering by the parting sheets.

The laminate, in a heated, plastic condition, is disposed between mold halves 70, 71 (FIG. 13), having upper and lower enlarged cavities, 72, 73 corresponding to the projected area of the parting sheets 59, 60. Introduction of fluid pressure through the tube 68 causes the layers of the laminate to flow into the shape of the cavities, as indicated in FIG. 14, thus forming bulges 74, 75 and a corresponding interior hollow 76. By reason of the partial overlapping of the non-adhering parting sheets 59, 60 with the interposed plastic strip 61, only a portion 63 of the lower surface of the plastic strip at one end and only a portion 65 of the plastic strip at the other end adheres to the inner surfaces of the foamed plastic layers 57, 58, while the medial zone 66 of the plastic strip remains nonadherent. As a consequence, such medial zone 66 takes the form, in the expansion step of a rigid transverse bracing member, connected to the upper and lower foamed layers at each end. Such internal bracing member gives unusual rigidity to the laminate and greatly increases its load bearing capacity while not adding appreciably to the weight. It will be understood of course that this form of the invention is applicable as well to laminate made entirely of solid plastic layers rather than partly of foamed plastic layers, and that as many transverse members as desired, located and shaped as desired, may be embodied either in hollow sections bulging from one side or the other of the laminate, or from both sides.

Having thus described my invention, what I claim and desire to protect by Letters Patent is:

1. A method of making a laminate of rigid thermoplastic heat-formable sheet material comprising providing at least two sheets of such rigid thermoplastic material, placing on a surface of one such sheet at a preselected area a layer of parting material, disposing an air-conducting means on the sheet leading from the parting material to the edge of the sheet, assembling the two thermoplastic sheets in face-to-face relationship with the parting material and air-conducting means sandwiched between the thermoplastic sheets, applying heat and pressure to unite the thermoplastic sheets together at their contacting faces, heating the resulting laminate to a temperature at which the thermoplastic material can readily be drawn into a desired shape, disposing the thus-heated laminate between mold members which confine the laminate against outward expansion everywhere except at the area of said parting layer, at which area at least one of the mold members is provided with an enlarged cavity, and applying differential pressure to the heated laminate to produce a thermoplastic deformation of at least one of the thermoplastic sheets at the said area into the shape of said enlarged cavity without producing thermoplastic deformation of the remainder of the laminate, whereby there is formed a hollow section between the thermoplastic sheets at the said parting layer whereby the rigidity of the laminate is increased.

2. A method of making a laminate of thermoplastic heat-formable sheet material comprising providing at least two rigid sheets of such thermoplastic material, disposing between such two sheets a rigid reinforcing strip of thermoplastic material compatible with said two sheets, disposing parting means between said two sheets at a preselected area, said parting means covering all but marginal edge portions on opposite faces at opposite ends of said reinforcing strip, the uncovered portions of the reinforcing strip being in contact with opposed faces of the thermoplastic sheets, subjecting the assembly to heat and pressure to unite the contacting surfaces of the two thermoplastic sheets and the uncovered portions of the reinforcing strip firmly together, disposing the resulting laminate between mold members which clamp the laminate securely at its marginal edge portions and which define an enlarged cavity located correspondingly to the parting means, subjecting the laminate to differential pressure while it is heated to a temperature at which it is readily deformable to form a hollow section within the laminate at said parting means, the said hollow section being bridge by the laid rigid reinforcing strip which extends generally transversely of said hollow section and serves to reinforce the laminate at said hollow section.

References Cited by the Examiner
UNITED STATES PATENTS

| | | | |
|---|---|---|---|
| 1,603,465 | 10/1926 | Hopkinson | 156—289 X |
| 1,970,802 | 8/1934 | Johnson | 156—145 X |
| 2,345,144 | 3/1944 | Opavsky | 264—96 |
| 2,466,586 | 4/1949 | Evans | 156—221 |
| 2,991,500 | 7/1961 | Hagen | 264—98 X |
| 3,070,481 | 12/1962 | Schornstheimer | 156—292 X |
| 3,149,017 | 9/1964 | Ehrreich et al. | 264—94 X |
| 3,161,553 | 12/1964 | Visser | 156—156 |

References Cited by the Applicant
UNITED STATES PATENTS

| | | |
|---|---|---|
| 2,739,093 | 3/1956 | Bull. |
| 3,018,268 | 1/1962 | Daly. |
| 3,026,231 | 3/1962 | Chavannes. |
| 3,039,911 | 6/1962 | Fox. |
| 3,041,220 | 6/1962 | Martin et al. |
| 3,048,514 | 8/1962 | Bentele. |
| 3,070,817 | 1/1963 | Martin et al. |
| 3,080,267 | 3/1963 | Schmalz. |

EARL M. BERGERT, *Primary Examiner.*

T. R. SAVOIE, *Assistant Examiner.*